Nov. 23, 1954  D. L. HOLBROOK ET AL  2,695,202
PILLOW BLOCK
Filed June 12, 1951
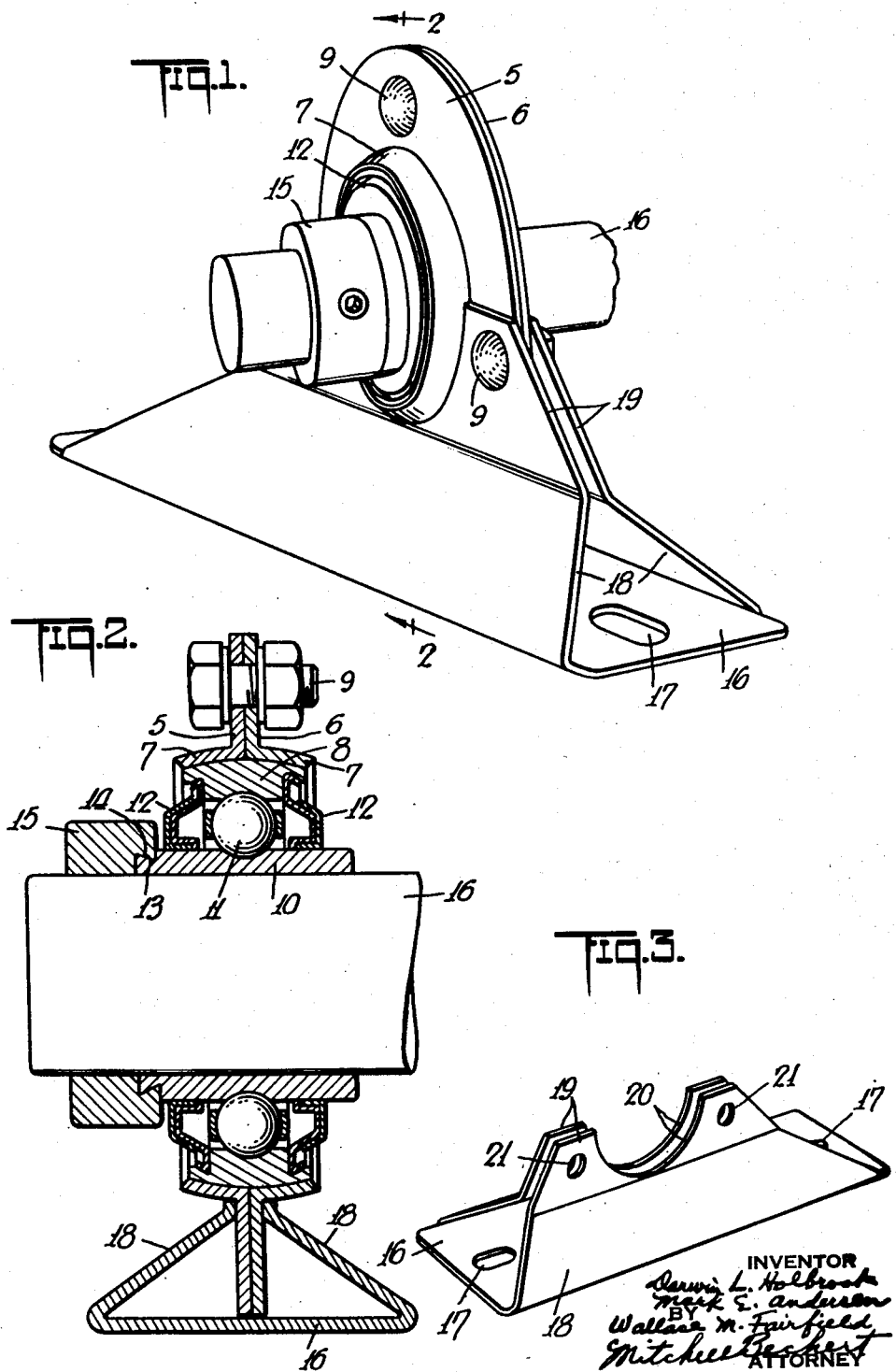

United States Patent Office 2,695,202
Patented Nov. 23, 1954

2,695,202
PILLOW BLOCK

Darwin L. Holbrook, San Marino, Mark E. Andersen, Los Angeles, and Wallace M. Fairfield, La Canada, Calif., assignors to The Fafnir Bearing Company, New Britain, Conn., a corporation of Connecticut Application June 12, 1951, Serial No. 231,182

5 Claims. (Cl. 308—72)

Our invention relates to a pillow block.

It is an object of the invention to provide an improved pillow block which is cheap to manufacture, light and sturdy in construction, and effective in use.

Other objects and features of invention will become apparent to those skilled in the art.

In the drawings which show, for illustrative purposes only, a preferred form of the invention:

Fig. 1 is a perspective view of a pillow block illustrative of the invention;

Fig. 2 is a central vertical sectional view taken substantially in the plane of line 2—2 of Fig. 1, and showing bolt instead of rivet securing means;

Fig. 3 is a perspective view on a smaller scale of the pillow block base shown in Figs. 1 and 2.

In the preferred form the pillow block includes a bearing housing comprising two flat housing plates in face to face abutting relationship each provided with an outwardly extending annular flange, the two flanges together providing a housing for a bearing. The two housing plates with their bearing are carried by a pillow block base which may consist of a base plate with integral upwardly extending flanges at opposite sides which converge toward each other and between which are sandwiched the housing plates. There are many ways such as welding, stitching, riveting and bolting for securing the housing plates to each other and to the base.

In the specific form shown the bearing housing comprises a pair of circular discs or housing plates 5—6 each having a transversely outwardly extending annular flange 7, the flanges having generally spherical inner contours and the two flanges together forming a generally spherical housing for an antifriction bearing outer ring 8 which itself has a generally spherical outer surface for fitting within the housing seat formed by the annular flanges 7—7. The two plates 5—6 may be secured together and to the base as by means of rivets 9 shown in Fig. 1 or by bolts 9' as shown in Fig. 2.

The complete bearing may include an outer ring 8, a long inner ring 10, and antifriction bearing members such as balls 11. The sides of the bearing may be sealed as by means of labyrinth seals 12—12. In the form illustrated one end of the long inner ring 10 is provided with a circumferential, eccentric camming surface 13 to be engaged by a corresponding surface 14 in a counterbore of the locking ring 15 fitting on the shaft 16. Thus when the inner ring 10 and the locking ring 15 are rotated relatively to each other to a slight extent the two rings will be quite rigidly locked to the shaft.

The bearing housing with its assembled bearing is carried by a pillow block base which may comprise a flat plate 16 to fit on a support or foundation and the plate may be provided with apertures 17—17 for receiving securing bolts for holding the pillow block on its foundation. The base plate 16 may have generally upwardly directed flanges 18—18 at opposite longitudinal sides thereof and the integral flanges 18—18 converge toward each other and the upper parts 19—19 of the flanges are preferably bent up so as to be parallel to each other and are spaced apart a distance substantially equal to the thickness of the combined housing plates 5—6. The parallel portions 19 of the base flanges are preferably apertured or cut away as shown at 20 for the reception and cradling support of the outwardly projecting annular housing flanges 7—7 on the housing plates. Thus the peripheral flat disc portions of the housing plates 5—6 are sandwiched between and held between the parallel portions 19—19 of the base flanges by any desired means such as the rivets 9 or bolts 9' passing through the registering apertures such as 21—21 in the flanges and through the housing discs 5—6 so as to securely hold the pillow block assembled. The outwardly extending annular flanges 7—7 on the housing plates are preferably cradled or supported by the seat surfaces 20—20 in the flanges 19—19 and if desired the parts are so proportioned that the bottom of the disc or peripheral portions of the housing plates 5—6 may rest on the base plate as shown in Fig. 2. Thus the base with its converging flanges, forming a generally triangular section as shown particularly in Fig. 2, will provide a sturdy and stable base for the bearing housing and bearing carrying the shaft. When the parts are secured by bolts, various combinations may be made in the field. When rivets or other permanent fastenings are used, changes may not readily be made in the field but neither can parts work loose.

Our improved pillow block will permit substantial self-alignment. The pillow block is very sturdy in construction, cheap to manufacture, easy to install, and will provide the advantages of a self-aligning antifriction bearing pillow block of quality at relatively low cost.

While the invention has been described in considerable detail in the preferred forms shown, it will be understood that modifications may be made within the scope of the invention as defined in the appended claims.

We claim:

1. In a pillow block, a bearing housing comprising a pair of flat housing plates each having an annular flange extending outwardly therefrom and defining a bearing housing cavity between them, a base comprising a plate to fit on a support, said plate having upwardly directed flanges at opposite sides thereof and converging, said flanges beyond said converging portions being flat and parallel to each other, said parallel portions having open generally semi-circular cut-outs to receive and cradle said annular flanges on said housing plates, said flat housing plates being sandwiched between the parallel parts of said upwardly directed base flanges, and securing means extending through said upwardly directed flanges and said housing plates to secure said bearing housing to the base in unitary fashion.

2. In a pillow block, a bearing housing comprising a pair of housing plates in face to face relation, each plate having a substantially axially outwardly directed annular flange, said flanges forming a bearing cavity between them, a base comprising a base plate having upwardly directed flanges converging toward each other until they reach a distance apart about equal to the thickness of said pair of housing plates and then lying parallel to each other at said distance apart, said housing plates being sandwiched between said parallel portions of said upwardly directed flanges, said parallel portions of said upwardly directed flanges having generally circular seating surfaces of a size to receive said outwardly directed annular flanges on said housing plates, said annular flanges being seated on said seating surfaces and securing means extending through said parallel portions of said upwardly directed flanges and said housing plates radially outwardly of said annular flanges to secure the bearing housing to the base.

3. As an article of manufacture, a pillow block base comprising a base plate to fit a support and having side flanges extending upwardly from opposite sides thereof and converging toward each other and having parts parallel to each other beyond the converging parts, said parallel parts of said side flanges having aligned generally semi-circular open cradle recesses defined by edge metal surfaces for receiving generally circular outwardly directed flanges on a bearing housing.

4. In a pillow block, a bearing housing comprising a pair of circular flat housing plates in face to face relationship, each housing plate having a transversely outwardly directed annular flange, said annular flanges between them forming a bearing housing cavity for a bearing, said housing plates having flat annular plate surfaces beyond said transverse annular flanges, a base for said bearing housing comprising a base plate to fit a support, said base plate having integral flanges at opposite sides extending upwardly and inwardly toward each other, said integral flanges having generally parallel parts beyond the inwardly directed parts, said generally parallel flange parts having circular recesses for receiving the transversely outwardly directed annular flanges on the housing plates, said flat annular plate surfaces on said housing plates and the parallel parts of said flanges on the base plate being interleaved and means extending through all of said parallel flanges and parts to hold all said parts together.

5. In a pillow block, a bearing housing comprising a pair of housing face plates secured together, said face plates having oppositely outwardly extending annular flanges forming a bearing cavity between them, a base to be secured to a support and having upstanding integral flanges, said upstanding flanges having arcuate seats therein presenting upstanding edge cradle surfaces to receive and embrace said outwardly extending annular flanges on said face plates, and securing means holding said face plates and said upstanding integral flanges on said base together in unit handling relationship.

References Cited in the file of this patent

UNITED STATES PATENTS

| Number | Name | Date |
|---|---|---|
| 1,606,747 | Carter | Nov. 16, 1926 |
| 2,279,887 | Hathorn | Apr. 14, 1942 |
| 2,402,254 | Maddock | June 18, 1946 |
| 2,462,622 | Farrow, Jr. | Feb. 22, 1949 |